(12) United States Patent
Fuse et al.

(10) Patent No.: US 7,828,443 B2
(45) Date of Patent: Nov. 9, 2010

(54) PROJECTOR

(75) Inventors: Makoto Fuse, Matsumoto (JP); Osamu Ishibashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 709 days.

(21) Appl. No.: 11/703,789

(22) Filed: Feb. 8, 2007

(65) Prior Publication Data

US 2007/0188714 A1 Aug. 16, 2007

(30) Foreign Application Priority Data

Feb. 15, 2006 (JP) ............................ 2006-038046

(51) Int. Cl.
G03B 21/14 (2006.01)
G02B 21/10 (2006.01)
G02B 5/30 (2006.01)
G02B 27/28 (2006.01)

(52) U.S. Cl. ...................... 353/20; 353/38; 359/622; 359/500

(58) Field of Classification Search .................. 353/20, 353/38, 31, 119, 100; 359/619, 621, 622, 359/496, 500, 495; 349/9, 5, 7, 8
See application file for complete search history.

(56) References Cited

U.S. PATENT DOCUMENTS

| | | | | |
|---|---|---|---|---|
| 6,312,130 B2 * | 11/2001 | Haba et al. | ...................... | 353/34 |
| 6,631,039 B2 | 10/2003 | Fujimori et al. | | |
| 6,857,745 B2 * | 2/2005 | Kitabayashi et al. | .......... | 353/20 |
| 6,866,387 B2 * | 3/2005 | Ogawa | ........................ | 353/20 |
| 2004/0165151 A1 * | 8/2004 | Kitabayashi et al. | .......... | 353/30 |
| 2004/0263697 A1 * | 12/2004 | Fuse et al. | ...................... | 349/5 |
| 2005/0094937 A1 | 5/2005 | Sato et al. | | |

FOREIGN PATENT DOCUMENTS

| | | |
|---|---|---|
| JP | A 11-242186 | 9/1999 |
| JP | A-2000-056198 | 2/2000 |
| JP | A-2002-062587 | 2/2002 |
| JP | A-2003-075701 | 3/2003 |
| JP | A-2005-138334 | 6/2005 |
| JP | A-2005-141091 | 6/2005 |

* cited by examiner

*Primary Examiner*—William C Dowling
*Assistant Examiner*—Ryan Howard
(74) *Attorney, Agent, or Firm*—Oliff & Berridge PLC (57) ABSTRACT

A projector includes an integrator illumination optical system. The integrator illumination optical system includes: a first lens array having a plurality of first small lenses, a second lens having a plurality of second small lenses, and a polarization converter including: polarization separating layers. The second small lenses of the second lens array are each arranged with its convex surface oriented to the light-irradiation side. A light shield section is provided on a portion on an incident-side surface of the polarization converter, the portion excluding a light-incident surface corresponding to the polarization separating layers. An extending portion is formed on one of the second lens array and the polarization converter in a manner extending toward the other one of the second lens array and the polarization converter, the second lens array and the polarization converter bonded and fixed to each other by bonding and fixing the extending portion to the other one.

6 Claims, 3 Drawing Sheets

PROJECTOR

The entire disclosure of Japanese Patent Application No. 2006-038046, filed Feb. 15, 2006, is expressly incorporated by reference herein.

BACKGROUND

1. Technical Field

The present invention relates to a projector.

2. Related Art

There has been known a projector that modulates with an optical modulator a light beam irradiated by a light source in accordance with image information to form an optical image and projects the optical image in an enlarged manner.

Such a projector includes an integrator illumination optical system for separating the light beam irradiated by the light source into sub light beams to superpose the sub light beams onto an illuminated area of the optical modulator.

The integrator illumination optical system includes a plurality of optical elements such as a second lens array and a polarization converter. In order to prevent misalignment between the optical elements and to simplify manufacture of the projector, there has been proposed an integrator illumination optical system in which the optical components are housed in a frame as a unit (see, for instance, Document: JP-A-11-242186).

In a projector disclosed in the Document, the second lens array, a light shield plate and the polarization converter are arranged from the upper stream side in a light-beam traveling direction, these optical elements positioned relative to each other and fit in the frame of the unit.

However, the projector disclosed in the Document uses the frame to form the integrator illumination optical system as a unit, which increases the size and the number of components of the integrator illumination optical system. In addition, the light shield plate is disposed between the second lens array and the polarization converter, and therefore a clearance for the light shield plate is required between the second lens array and the polarization converter, which causes the size of the integrator illumination optical system to be increased. Since the optical elements are fixed to each other via the frame, misalignment might occur in relative positions of the optical elements.

SUMMARY

An object of the invention is to provide a projector that can reduce the size and the number of components of an integrator illumination optical system and prevents misalignment of optical elements of the integrator illumination optical system.

In order to achieve the object described above, a projector according to an aspect of the invention that includes a light source, an optical modulator which modulates a light beam irradiated by the light source in accordance with image information to form an optical image and a projection optical device which projects the optical image formed by the optical modulator in an enlarged manner. The projector further includes an integrator illumination optical system which uniforms the light beam irradiated by the light source to uniformly illuminate an image formation area of the optical modulator. The integrator illumination optical system includes: a first lens array having a plurality of first small lenses in a plane substantially orthogonal to an optical axis of the light beam irradiated by the light source, the first lens array separating the light beam into a plurality of sub light beams by the plurality of first small lenses; a second lens array disposed on a light-irradiation side of the first lens array, the second lens array having a plurality of second small lenses corresponding to the plurality of first lenses of the first lens array; and a polarization converter disposed on a light-irradiation side of the second lend array, the polarization converter aligning a polarization direction of the light beam irradiated from the second lens array substantially uniformly. The polarization converter includes: polarization separating layers each having a longitudinal direction in a first direction in a plane substantially orthogonal to the optical axis of the light beam irradiated by the light source, the polarization separating layers each transmitting a polarized light having one polarization direction while reflecting a polarized light having the other polarization direction in the light beam incident on the polarization separating layer; reflection layers arranged alternately with the polarization separating layers along a second direction substantially orthogonal to the optical axis of the light beam irradiated by the light source and to the first direction, the reflection layers each reflecting the polarized light reflected by each of the polarization separating layers in the same direction as the polarized light transmitted by each of the polarization separating layers; and phase layers disposed at a position corresponding to the polarization separating layers or the reflection layers, the phase layers each converting the polarization direction of the polarized light beam incident thereon to the other polarization direction. The second small lenses of the second lens array are each arranged with its convex surface oriented to the light-irradiation side. A light shield section is provided on a portion on an incident-side surface of the polarization converter, the portion excluding a light-incident surface corresponding to the polarization separating layers. An extending portion is formed on one of the second lens array and the polarization converter in a manner extending toward the other one of the second lens array and the polarization converter, the second lens array and the polarization converter bonded and fixed to each other by bonding and fixing the extending portion to the other one.

According to the aspect of the invention, the second lens array and the polarization converter are directly bonded and fixed to each other via the extending portion extending from one of the second lens array and the polarization converter. With the arrangement, the integrator illumination optical system does not include a frame or the like to fix the second lens array and the polarization converter, thereby reducing the number of components and the size of the integrator illumination optical system. In addition, by minimizing the dimension in an extending direction of the extending portion to an extent that does not allow the convex surfaces of the small lenses of the second lens array to contact with the polarization converter, a clearance width between the second lens array and the polarization converter can be minimized. Accordingly, the size of the integrator illumination optical system can further be reduced.

Since the second lens array and the polarization converter are not fixed by an additional member such as the frame, ventilation around the second lens array and the polarization converter is good. Accordingly, heat generated in the second lens array and the polarization converter can be released with an enhanced efficiency.

The second lens array and the polarization converter are directly bonded and fixed to each other via the extending portion, which can prevent misalignment of the second lens array and polarization converter relative to each other.

The light shield sections are provided on portions of the incident-side surface of the polarization converter, the portions excluding the light-incident surface corresponding to the polarization separating layer. With the arrangement, a light shield plate does not have to be separately provided between the second lens array and the polarization converter in the integrator illumination optical system, so that clearances for separately providing the light shield plate are not required in both portions between the second lens array and the shield plate and between the shield plate and the polarization converter. Accordingly, the dimension in the extending direction of the extending portion can be set short, which can further reduce the size of the integrator illumination optical system.

The light shield sections are provided on the portions of the incident-side surface of the polarization converter, the portions excluding the light-incident surface corresponding to the polarization separating layer. With the arrangement, the light incident on the polarization converter can be securely incident only on the light-incident surface corresponding to the polarization separating layer. Accordingly, the light that is not incident on the polarization separating layer can be prevented from generating heat on the polarization converter.

The second lens array needs to refract the incident light beam with the second small lenses to irradiate the light beam in a direction substantially orthogonal to the incident-side surface of the polarization converter. This is because the polarization separating layer of the polarization converter has an incident angle dependence of the light beam.

In a case where the second small lenses are each arranged with its convex surface oriented to the light incident side and its flat surface oriented to the light irradiation side, the second small lenses have to refract the light beam on the convex surface (the light-incident surface) in a direction substantially orthogonal to the flat surface (the light-irradiation surface) because the light beam has to be irradiated from the flat surface in the direction substantially orthogonal to the flat surface. Specifically, the second small lenses have to convert a light irradiation direction to be substantially orthogonal to the incident-side surface of the polarization converter by one refraction. Thus, the convex surface of the second small lens requires to have a large refraction angle, namely requires to have a large curvature.

In contrast, in the aspect of the invention, the second small lenses are each arranged with its flat surface oriented to the light incident side and its convex surface oriented to the light irradiation side. With the arrangement, since the second small lens can refract the light beam on the convex surface (the light-irradiation surface) in the direction substantially orthogonal to the incident-side surface of the polarization converter, the second small lens can refract the incident light beam two times on the flat surface (the light-incident surface) and the convex surface. That is to say, the second small lens can convert the light irradiation direction to be substantially orthogonal to the incident-side surface of the polarization converter by two refractions, which allows a refraction angle at one refraction to be smaller. Accordingly, the second small lens does not have to have a large curvature, so that the second small lens can be formed easily and decrease of light utilization efficiency caused by aberration of the second small lens can be reduced.

According to the aspect of the invention, the light shield section is preferably a reflection film that is formed by depositing metal having a high reflectance on the incident-side surface of the polarization converter.

Examples of the metal having a high reflectance may include aluminum, silver and copper.

According to the aspect of the invention, the light shield section is the light shield film that is formed by depositing the metal having the high reflectance on the incident-side surface of the polarization converter, the thickness of the light shield section along the optical axis is relatively small. Accordingly, the dimension in the extending direction of the extending portion can be set short, which further reduces the size of the integrator illumination optical system.

The light shield film is formed by the metal having the high reflectance. With the arrangement, the light shield film reflects the light irradiated thereto with the high reflectance, which prevents heat from being generated on the light shield film. Therefore, the polarization converter can be prevented from being degraded by heat.

BRIEF DESCRIPTION OF THE DRAWINGS

The invention will be described with reference to the accompanying drawings, wherein like numbers reference like elements.

DESCRIPTION OF EXEMPLARY
EMBODIMENT(S)

An exemplary embodiment of the invention will be described below with reference to the attached drawings.
Arrangement of Projector FIG. 1 is an illustration schematically showing an outline of a projector 1.

The projector 1 modulates a light beam irradiated by a light source in accordance with image information to form an optical image and projects the formed optical image on a screen (not shown) in an enlarged manner. The projector 1 includes an exterior casing 2, a projection lens 3 (projection optical device) and an optical unit 4 as shown in FIG. 1.

Figure 1:
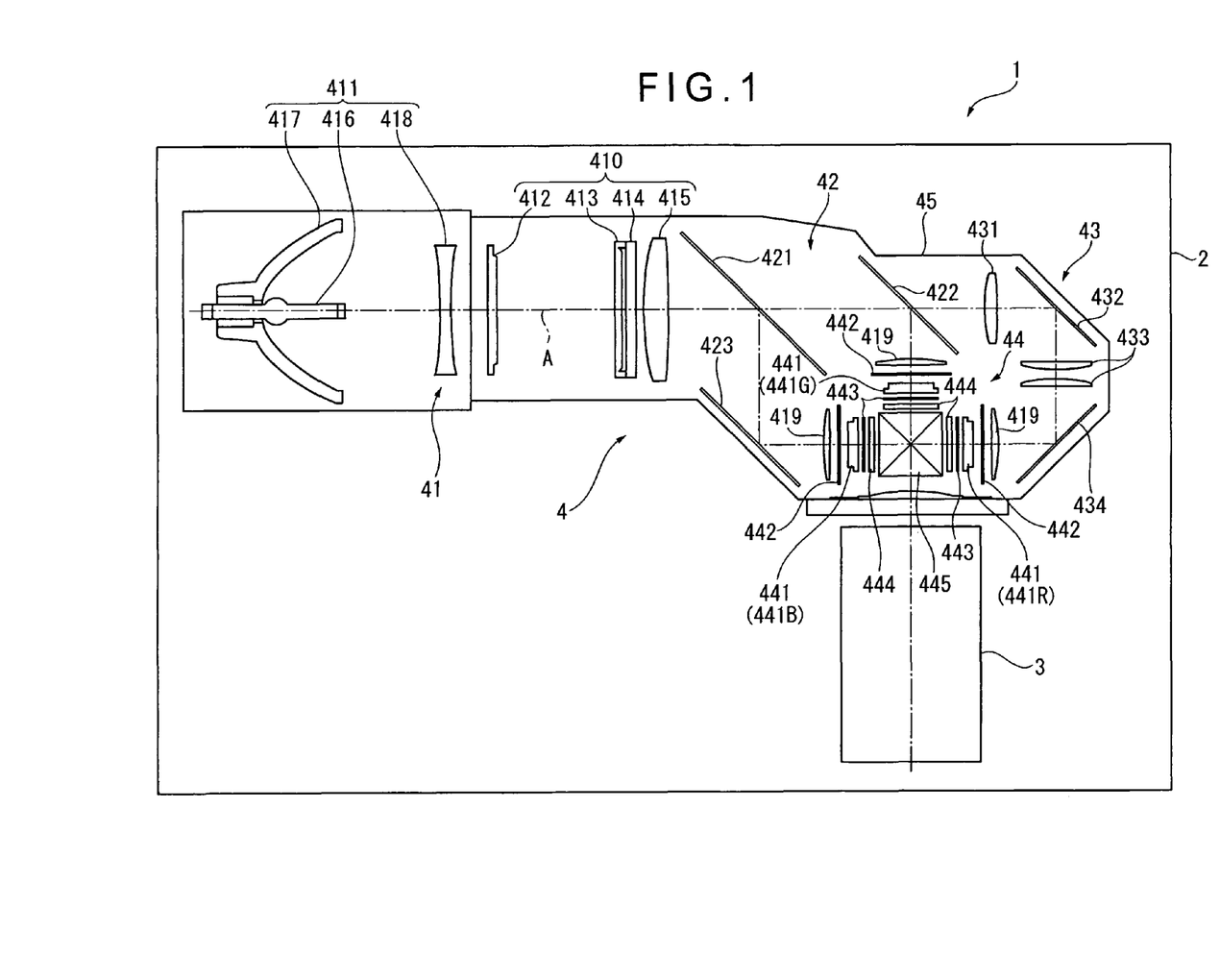
FIG. 1 is a plan view schematically showing an optical unit of a projector according to an exemplary embodiment of the invention.

Although not shown in FIG. 1, a cooling unit including a cooling fan or the like for cooling inside the projector 1, a power source unit for supplying electric power to components inside the projector 1 and a control device for controlling the entire operation of the projector 1 are disposed in a space not occupied by the projection lens 3 and the optical unit 4 in the exterior casing 2.

The exterior casing 2 is made of synthetic resin or the like and is formed in a substantially rectangular-parallelepiped shape as a whole, in which the projection lens 3 and the optical unit 4 are accommodated as shown in FIG. 1. Although not shown, the exterior casing 2 includes an upper case and a lower case, the upper case forming a top surface, a front surface, a rear surface and lateral surfaces of the projector 1, the lower case forming a bottom surface, the front surface and the rear surface of the projector 1. The upper case and the lower case are fixed to each other by screws or the like.

The material of the exterior casing 2 may not be limited to the synthetic resin. For example, the exterior casing 2 may be made of metal.

The optical unit 4 optically processes a light beam irradiated by the light source to form an optical image (color image) in accordance with image information under the control of the control device. As shown in FIG. 1, the optical unit 4 has a substantial L-shape in plan view extending along the rear surface and a lateral surface of the exterior casing 2. Note that an arrangement of the optical unit 4 will be described later in detail.

The projection lens 3 projects the optical image (color image) formed by the optical unit 4 on a screen (not shown) in an enlarged manner. The projection lens 3 is a lens set which accommodates a plurality of lenses in a cylindrical barrel.

Detailed Description of Arrangement of Optical Unit

As shown in FIG. 1, the optical unit 4 includes an illumination optical device 41, a color-separating optical device 42, a relay optical device 43, an optical device 44 and an optical component casing 45. The optical component casing 45 accommodates the optical components 41 to 44 and fixedly supports the projection lens 3 at a predetermined position.

The illumination optical device 41 is an optical system for substantially uniformly illuminating an image formation area of each of later-described liquid crystal panels 441 of the optical device 44. The illumination optical device 41 includes a light source device 411 and an integrator illumination optical system 410 as shown in FIG. 1.

As shown in FIG. 1, the light source device 411 includes a light source lamp 416 (light source) for irradiating a radial light beam, a reflector 417 for reflecting the radial light beam irradiated by the light source lamp 416 and converging the radial light beam onto a predetermined position and a parallelizing concave lens 418 for parallelizing the light beam converged by the reflector 417 relative to an illumination optical axis A. As the light source lamp 416, a halogen lamp, a halide lamp or a high-pressure mercury lamp is typically used. Although the reflector 417 is an ellipsoidal reflector having a rotary ellipsoidal surface, the reflector 417 may be a parabolic reflector having a rotary parabolic surface. In such case, the parallelizing concave lens 418 is omitted.

Incidentally, the optical axis (the central axis) of the light beam irradiated by the light source device 411 corresponds to the illumination optical axis A.

The integrator illumination optical system 410 includes a first lens array 412, a second lens array 413, a polarization converter array 414 (polarization converter) and a superposing lens 415.

The first lens array 412 has first small lenses arranged in a matrix form in a plane substantially orthogonal to the illumination optical axis A, each lens having a substantially rectangular profile when viewed in a direction along the illumination optical axis A. Each of the first small lenses separates the light beam irradiated by the light source device 411 into a plurality of sub light beams.

The second lens array 413 has substantially the same arrangement as the first lens array 412 and includes small lenses (second small lenses) that are arranged in a matrix form. The second lens array 413 focuses images of the small lenses of the first lens array 412 onto an image formation area (illuminated area) in the later-described liquid crystal panels 44 of the optical device 44 together with the superposing lens 415.

The polarization converter array 414 is disposed between the second lens array 413 and the superposing lens 415. The polarization converter array 414 converts the lights from the second lens array 413 into a substantially uniform linear polarized light.

Specifically, the respective sub light beams converted into the substantially uniform linear polarized light by the polarization converter array 414 are substantially superposed on the image formation area of the later-described liquid crystal panels 441 of the optical device 44 by the superposing lens 415. Meanwhile, only the uniform polarized light can be used in the projector in which the liquid crystal panels 441 are used to convert a polarized light, so that approximately half the light beam from the light source device 411 emitting random polarized light cannot be used. Therefore, with the use of the polarization converter array 414, the light beam irradiated by the light source device 411 is converted into the substantially uniform polarized light, thereby enhancing the light utilization efficiency of the optical device 44.

Arrangements of the second lens array 413 and the polarization converter array 414 will be described later in detail.

As shown in FIG. 1, the color-separating optical device 42 has two dichroic mirrors 421, 422 and a reflection mirror 423 and separates the plurality of sub light beams irradiated from the illumination optical device 41 by the dichroic mirrors 421, 422 into three color lights of red, green and blue.

The relay optical device 43 includes an incident-side lens 431, a relay lens 433 and reflection mirrors 432, 434 and guides the color lights separated by the color-separating optical device 42 to a red-light liquid crystal panel 441R.

Red and green lights of the light beam irradiated from the illumination optical device 41 are transmitted by the dichroic mirror 421 of the color-separating optical device 42 and a blue light thereof is reflected by the dichroic mirror 421. The blue light that has been reflected by the dichroic mirror 421 is then reflected by the reflection mirror 423 and transmitted by a field lens 419 to reach a blue-light liquid crystal panel 441B. The field lens 419 converts the respective sub light beams irradiated from the second lens array 413 into light beams parallel to the central axis (main beam) of the filed lens 419. The field lenses 419 provided on the light-incident sides of a green-light liquid crystal panel 441G and the red-light liquid crystal panel 441R function in the same manner.

The green light out of the red and green lights transmitted by the dichroic mirror 421 is reflected by the dichroic mirror 422 and transmitted by the field lens 419 to reach the green-light liquid crystal panel 441G. The red light passes through the dichroic mirror 422, the relay optical device 43 and the field lens 419 to reach the red-right liquid crystal panel 441R. Note that the relay optical device 43 is used for the red light in order to avoid deterioration in the light utilization efficiency due to light dispersion and the like caused by that the optical path of the red light is longer than those of the other color lights. In other words, the relay optical device 43 is used for directly transmitting the sub light beams incident on the incident-side lens 431 to the field lens 419. Note that, although the red light out of the three color lights is adapted to pass through the relay optical device 43, the blue light, for instance, may pass through the relay optical device 43.

The optical device 44 modulates each of the three color lights irradiated from the color-separating optical device 42 in accordance with image information to form a color-light image for each color light and form an optical image (color image) as the formed color-light image. As shown in FIG. 1, the optical device 44 includes: the three liquid crystal panels 441 (optical device) (including the red-light liquid crystal panel 441R, the green-light liquid crystal panel 441G and the blue-light liquid crystal panel 441B); three incident-side polarization plates 442 respectively disposed on the light-incident sides of the liquid crystal panels 441; three view angle compensating plates 443 respectively disposed on the light-irradiation sides of the liquid crystal panels 441; three irradiation-side polarization plates respectively disposed on the light-irradiation sides of the view angle compensating plates 443; and a cross dichroic prism 445.

Each of the color lights of which polarization directions are aligned into a substantially uniform direction by the polarization converter array 414 is incident on the incident-side polarization plate 442. The incident-side polarization plate 442 only transmits a polarized light having substantially the same direction as the polarization axis of the light beam that is aligned by the polarization converter array 414 out of the incident light beams and absorbs the other light beams. The incident-side polarization plate 442 has a light-transmissive substrate made of sapphire glass, crystal or the like with a polarization film attached on the substrate.

Although not shown, the liquid crystal panel 441 has liquid crystal as an electrooptic material sealed in a pair of transparent glass substrates. The orientation of the liquid crystal is controlled in accordance with a drive signal from the control device so that the polarization direction of the polarized light beam irradiated from the incident-side polarization plate 442 is modulated.

The view angle compensating plate 443 is formed as a film attached on an incident-side surface of the irradiation-side polarization plate 444.

Although described later in detail, the irradiation-side polarization plate 444 only transmits a light beam having a polarization axis orthogonal to the light-transmissive axis of the incident-side polarization plate 442 out of the light beams that have been irradiated from the liquid crystal panel 441 and transmitted by the view angle compensating plate 443 and absorbs the other light beams.

The cross dichroic prism 445 is an optical element for combining modulated lights that have been modulated for each color light irradiated from the irradiation-side polarization plate 444 to form an optical image (color image). The cross dichroic prism 445 is square in plan view, which is formed by attaching four right-angle prisms. Two dielectric multi-layer films are formed on the boundaries where the right-angle prisms are attached to each other. The dielectric multi-layer films transmit the color light that has passed through the irradiation-side polarization plate 444 disposed on a side opposing to the projection lens 3 (on the green-light liquid crystal panel side) and reflect the color lights that have passed through the other two irradiation-side polarization plates 444 (on the red- and blue-light liquid crystal panel sides). With the arrangement, the color lights modulated by the incident-side polarization plates 442, the liquid crystal panels 441, the view angle compensating plates 443 and the irradiation-side polarization plates 444 are combined and the color image is formed.

Arrangement of Second Lens Array and Polarization Converter Array

Figure 2:
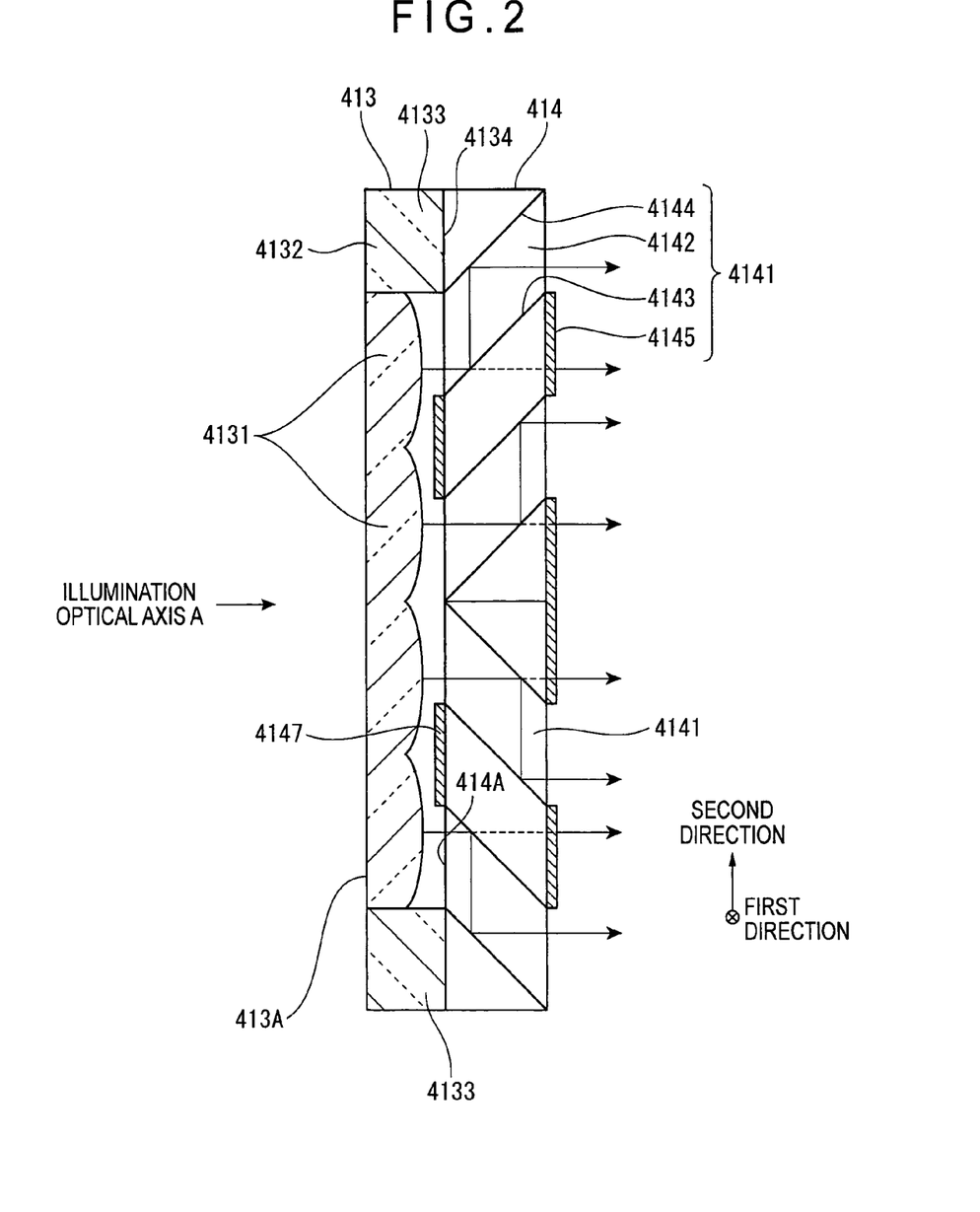
FIG. 2 is a cross section schematically showing a second lens array and a polarization converter array according to the exemplary embodiment.

FIG. 2 is an illustration schematically showing a cross section taken along the illumination optical axis A of the second lens array 413 and the polarization converter array 414.

As described above, the second lens array 413 has the plurality of small lenses 4131. A frame 4132 is formed along the outer circumference of a set of the small lenses 4131.

As shown in FIG. 2, the small lenses 4131 are each disposed with its convex surface oriented to the light-irradiation side.

Columnar extending portions 4133 are formed on four corners of the irradiation side surface of the frame 4132, the extending portions 4133 extending toward the light-irradiation side. An irradiation-side surface of the extending portion 4133 defines a bonded surface 4134 which is bonded to an incident-side surface 414A (described later) of the polarization converter array 414.

Figure 3:
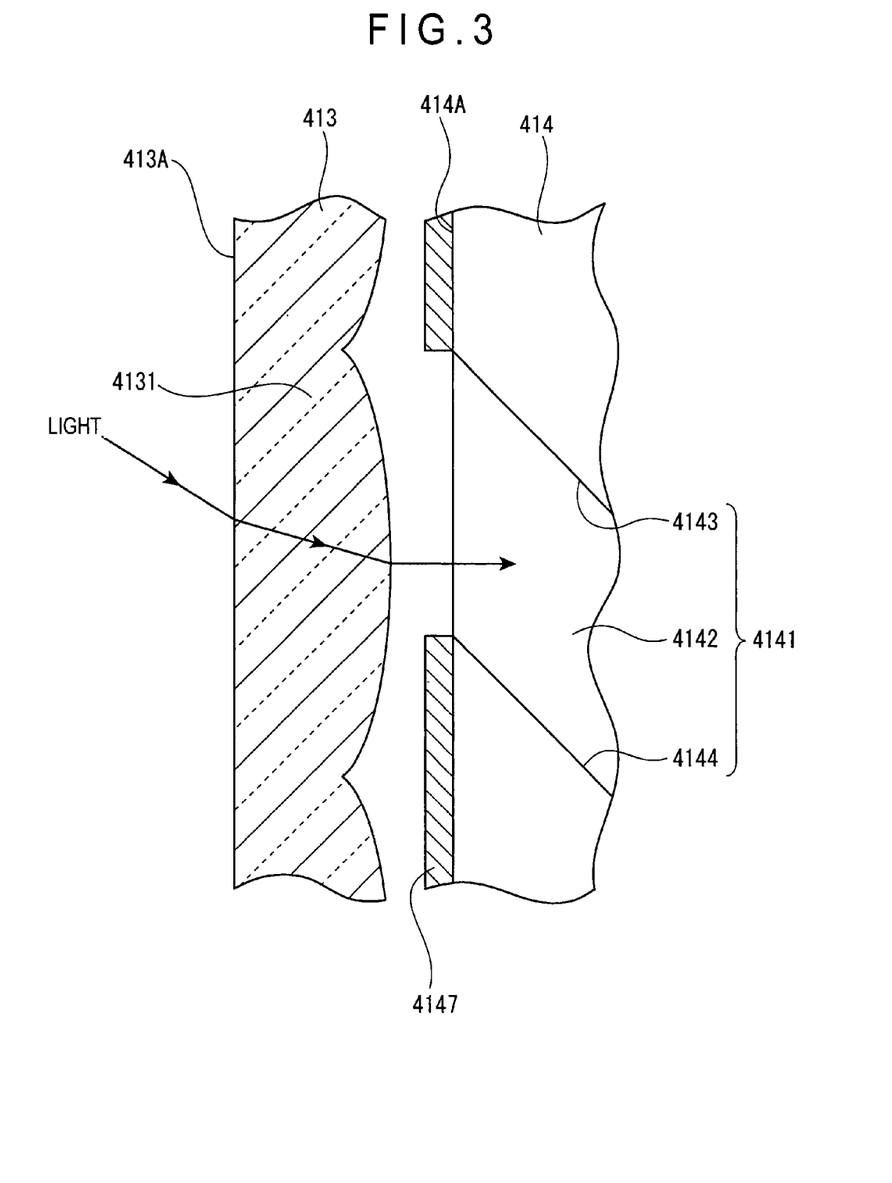
FIG. 3 is an illustration showing an optical path of a light passing through small lenses of the second lens array according to the exemplary embodiment.

Next, how the light transmitted by the small lenses 4131 is refracted will be described.

FIG. 3 is an illustration showing an optical path of the light transmitted by one small lens 4131 of the second lens array 413. The arrow in FIG. 3 shows the optical path of the light transmitted by this small lens 4131.

When light travels between the atmosphere and glass, of which refraction indexes are different from each other, the light is refracted at the boundary between the atmosphere and the glass. However, when the light is incident on the boundary between the atmosphere and the glass at the right angle, the light is not refracted.

Here, in the integrator illumination optical system 410, the second lens array 413 needs to let the light be incident substantially at the right angle on the incident-side surface 414A of the polarization converter array 414. This is because the polarization separating layer of the polarization converter has an incident angle dependence of the light beam.

As shown in FIG. 3, the small lens 4131 of the second lens array 413 is disposed with its convex surface oriented to the light-irradiation side in the exemplary embodiment, so that a light-incident surface of the small lens 4131 is a flat surface.

Now, an optical pass of the light incident at an inclined angle on the flat surface (the light-incident surface) of the small lens 4131 will be described. The incident light is refracted at the boundary between the outside and the flat surface of the lens, where a travel direction of the light is changed. The light transmitted by the small lens 4131 is irradiated toward the outside from the convex surface of the small lens 4131. At this time, the light to be irradiated is refracted again at the boundary between the convex surface of the lens and the outside, where the travel direction of the light is changed.

As described above, since the convex surface of the small lens 4131 is oriented to the light-irradiation side in the exemplary embodiment, the light incident on the second lens array 413 is refracted two times to be irradiated. That is to say, the second lens array 413 converts the travel direction of the light incident at the inclined angle on the incident-side surface 413A by two refractions so that the travel direction of the light becomes substantially orthogonal to the incident-side surface 414A of the second lens array 413.

As shown in FIG. 2, the polarization converter array 414 has a rectangular shape in which a plurality of polarization converters 4141 are arranged along a plane orthogonal to the travel direction of the light beam.

The polarization converter 4141 includes a light-transmissive member 4142 having a parallelogram cross section, a polarization separating film 4143 (polarization separating layer) formed on a boundary of the light-transmissive member 4142, a reflection film 4144 (reflection layer) and a phase plate 4145 (phase layer) disposed on a boundary on the light-irradiation side of the light-transmissive member 4142.

The polarization separating film 4143 and the reflection film 4144 each have a longitudinal direction in a first direction substantially orthogonal to the illumination optical axis A (the direction vertical to the paper surface of FIG. 2). The polarization separating films 4143 and the reflection films 4144 are alternately arranged along a second direction substantially orthogonal to the illumination optical axis A and the first direction (the direction parallel to the paper surface of FIG. 2). Note that, although the phase plate 4145 is disposed at a position corresponding to the light transmitted by the polarization separating film 4143 in the exemplary embodiment, the phase plate 4145 may be disposed at a position corresponding to a light reflected by the reflection film 4144.

Now, how the light incident on the polarization converter 4141 behaves will be simply described. The lights incident on the polarization converter 4141, which have random polarization directions, are first separated by the polarization separating film 4143 into an s-polarized light and a p-polarized light. The separated p-polarized light is transmitted by the polarization separating film 4143 and is incident on the phase plate 4145. The p-polarized light incident on the phase plate 4145 is converted to the s-polarized light by the phase plate 4145 to be irradiated. Meanwhile, the s-polarized light separated by the polarization separating film 4143 is reflected by the polarization separating film 4143 substantially at the right angle. The light is then reflected by the reflection film 4144 substantially at the right angle toward the light irradiation side to be irradiated. Accordingly, the incident lights are converted to the substantially uniform polarized light by the polarization converter array 414 to be irradiated. Although the polarization converter 4141 irradiates the s-polarized light in the exemplary embodiment, the polarization converter 4141 may irradiate the p-polarized light.

Light shield films 4147 (light shield sections) are provided on portions of the incident-side surface 414A of the polarization converter array 414, the portions excluding the light-incident surface corresponding to the polarization separating film 4143. The light shield film 4147 is provided for preventing the light not incident on the polarization separating film 4143 from generating heat on the incident-side surface 414A.

The light shield film 4147 is formed by depositing aluminum on the incident-side surface 414A of the polarization converter array 414. Incidentally, the light shield film 4147 may be formed by any metal having a high reflectance such as silver and copper without limiting to the aluminum.

As described above, the bonded surfaces 4134 of the extending portions 4133 of the second lens array 413 are bonded and fixed to the four corners on the incident-side surface 414A of the polarization converter array 414, by which the second lens array 413 and the polarization converter array 414 are fixed to each other.

As shown in FIG. 2, the dimension in the extending direction of the extending portion 4133 is set such that a clearance between the second lens array 413 and the polarization converter array 414 is minimized to an extent that does not allow the convex surface of the small lens 4131 to contact with the incident-side surface 414A of the polarization converter array 414.

The second lens array 413 and the polarization converter array 414 are directly fixed to each other via the extending portion 4133 extending from the frame 4132 of the second lens array 413 in the exemplary embodiment. Accordingly, the integrator illumination optical system 410 does not include a frame or the like to fix the second lens array 413 and the polarization converter array 414, thereby reducing the number of components and the size of the integrator illumination optical system 410. Since the dimension in the extending direction of the extending portion 4133 is minimized to the extent that does not allow the convex surface of the small lens 4131 of the second lens array 413 to contact with the polarization converter array 414, the clearance between the second lens array 413 and the polarization converter array 414 is minimized, thereby further reducing the size of the integrator illumination optical system 410.

In addition, since the second lens array 413 and the polarization converter array 414 are not fixed by an additional member such as a frame for covering lateral sides of the second lens array 413 and the polarization converter array 414, ventilation around the arrays 413, 414 is good. Accordingly, heat generated in the second lens array 413 and the polarization converter array 414 can be released with an enhanced efficiency.

The second lens array 413 and the polarization converter array 414 are directly fixed to each other via the extending portion 4133, which can prevent misalignment of the second lens array 413 and polarization converter array 414 relative to each other.

The light shield films 4147 are provided on the portions of the incident-side surface 414A of the polarization converter array 414, the portions excluding the light-incident surface corresponding to the polarization separating film 4143. With the arrangement, since a light shield plate does not have to be separately provided between the second lens array 413 and the polarization converter array 414 in the integrator illumination optical system 410, clearances for separately providing the light shield plate are not required in both portions between the shield plate and the second lens array 413 and between the shield plate and the polarization converter array 414. Accordingly, the dimension in the extending direction of the extending portion 4133 can be set short, thereby further reducing the size of the integrator illumination optical system 410.

The light shield films 4147 are provided on the portions on the incident-side surface 414A of the polarization converter 414, the portions excluding the light-incident surface corresponding to the polarization separating film 4143. With the arrangement, the light incident on the polarization converter array 414 can be securely incident only on the light-incident surface corresponding to the polarization separating film 4143. Accordingly, the light that is not incident on the polarization separating film 4143 can be prevented from generating heat on the incident-side surface 414A.

The second lens array 413 needs to refract the incident light beam with the small lenses 4131 to irradiate the light beam in a direction substantially orthogonal to the incident-side surface 414A of the polarization converter array 414.

In a case where the small lenses 4131 are each arranged with its convex surface oriented to the light-incident side and its flat surface oriented to the light-irradiation side, the small lenses 4131 have to refract the light beam on the convex surface (the light-incident surface) in a direction substantially orthogonal to the flat surface (the light-irradiation surface) because the light beam has to be irradiated from the flat surface in the direction substantially orthogonal to the flat surface. Specifically, the small lenses 4131 have to convert a light irradiation direction to be substantially orthogonal to the incident-side surface 414A of the polarization converter array 414 by one refraction. Thus, the convex surface of the small lens 4131 needs to have a large refraction angle, namely needs to have a large curvature.

In contrast, in the exemplary embodiment, the small lenses 4131 are each arranged with its flat surface oriented to the light-incident side and its convex surface oriented to the light-irradiation side. With the arrangement, since the small lens 4131 can refract the light beam on the convex surface (the light-irradiation surface) in the direction substantially orthogonal to the incident-side surface 414A of the polarization converter array 414, the small lens 4131 can refract the incident light beam two times on the flat surface (the light-incident surface) and the convex surface. That is to say, the small lens 4131 can convert the light irradiation direction to be substantially orthogonal to the incident-side surface 414A of the polarization converter array 414 by two refractions, which allows a refraction angle at one refraction to be smaller. Accordingly, the small lens 4131 does not have to have a large curvature, so that the small lens 4131 can be formed easily and decrease of light utilization efficiency caused by aberration of the small lens 4131 can be reduced.

Since the light shield section of the exemplary embodiment is the light shield film 4147 that is formed by depositing metal having a high reflectance on the incident-side surface of the polarization converter array 414, the thickness of the light shield section along the illumination optical axis A is relatively small. Accordingly, the dimension in the extending direction of the above-described extending portion 4133 can be set even shorter. Therefore, the size of the integrator illumination optical system 410 can further be reduced.

The light shield film 4147 is formed by the metal having the high reflectance. With the arrangement, since the light shield film 4147 reflects the light irradiated thereto with a high reflectance, generation of the heat on the light shield film 4147 can be prevented. Accordingly, the polarization converter array 414 can be prevented from being degraded by heat.

Modification of Exemplary Embodiment

Although the best mode and the like for implementing the invention have been disclosed above, the invention is not limited thereto. Hence, the invention is not limited to the exemplary embodiment above, and therefore the invention includes a description using a name of the components without a part of or all of the limitation on the shapes, materials and the like.

The extending portions 4133 have a columnar shape and extend toward the light-irradiation side from the four corners on the irradiation-side surface of the frame 4132 in the exemplary embodiment above. However, the shape and the formation position in the frame 4132 of the extending portions 4133 are not limited in the invention. For example, the extending portions 4133 may extend substantially from the middle of each side of the frames 4132, or the extending portions 4133 may have a flat plate shape extending from a pair of opposing sides of the frame 4132.

Although the extending portions 4133 extend from the second lens array 413 in the exemplary embodiment above, the extending portions 4133 may extend from the polarization converter array 414 toward the second lens array 413 in the invention.

Although the optical unit 4 has a substantial L-shape in plan view in the exemplary embodiment above, the arrangement is not limited thereto. For example, the optical unit 4 may have a substantial U-shape in plan view.

In addition, although the projector 1 of the exemplary embodiment above employs the three liquid crystal panels 441R, 441G, 441B, the invention is not limited thereto. Specifically, the invention can be applied to a projector having two or four or more of liquid crystal panels.

Although the projector 1 including the liquid crystal panels 441 as the optical modulator is exemplified in the exemplary embodiment above, any optical modulator may be employed as long as the optical modulator modulates an incident light beam in accordance with image information to form an optical image. For example, the invention can be applied to a projector using an optical modulator other than the liquid crystal, which may be for instance a device using a micromirror. When such optical modulator is used, the incident-side and irradiation-side polarization plates 442, 444 may be omitted.

Although a front-type projector that projects an image in a direction for observing a screen is taken as an example in the exemplary embodiment above, the invention may also be applied to a rear-type projector that projects an image in a direction opposite to the direction for observing the screen.

What is claimed is:

1. A projector, comprising:

a light source;

an optical modulator that modulates a light beam irradiated by the light source in accordance with image information to form an optical image;

a projection optical device that projects the optical image formed by the optical modulator in an enlarged manner;

an integrator illumination optical system that uniforms the light beam irradiated by the light source to uniformly illuminate an image formation area of the optical modulator, the integrator illumination optical system having a first lens array, a second lens array and a polarization converter, the first lens array having a plurality of first small lenses in a plane substantially orthogonal to an optical axis of the light beam irradiated by the light source, the first lens array separating the light beam into a plurality of sub light beams by the plurality of first small lenses, the second lens array disposed on a light-irradiation side of the first lens array, the second lens array having a plurality of second small lenses corresponding to the plurality of first lenses of the first lens array, the second small lenses of the second lens array being each arranged with its convex surface oriented to the light-irradiation side, the polarization converter disposed on a light-irradiation side of the second lens array, the polarization converter aligning a polarization direction of the light beam irradiated from the second lens array substantially uniformly, the polarization converter having polarization separating layers, reflection layers and phase layers, the polarization separating layers each having a longitudinal direction in a first direction in a plane substantially orthogonal to the optical axis of the light beam irradiated by the light source, the polarization separating layers each transmitting a polarized light having one polarization direction while reflecting a polarized light having the other polarization direction in the light beam incident on the polarization separating layer, the reflection layers arranged alternately with the polarization separating layers along a second direction substantially orthogonal to the optical axis of the light beam irradiated by the light source and to the first direction, the reflection layers each reflecting the polarized light reflected by each of the polarization separating layers in the same direction as the polarized light transmitted by each of the polarization separating layers, the phase layers disposed at a position corresponding to the polarization separating layers or the reflection layers, the phase layers each converting the polarization direction of the polarized light beam incident thereon to the other polarization direction; and a light shield section provided on a portion on an incident-side surface of the polarization converter, the portion excluding a light-incident surface corresponding to the polarization separating layers, the second lens array having a light-irradiation-side surface and an extending portion formed on the light-irradiation-side surface of the second lens array, the light-irradiation-side surface of the second lens array and the incident-side surface of the polarization converter facing each other, the extending portion of the second lens array extending toward the incident-side surface of the polarization converter, the second lens array and the polarization converter being directly bonded and fixed to each other at a portion where the extending portion of the second lens array is bonded and fixed to the incident-side surface of the polarization converter.

2. The projector according to claim 1, wherein the light shield section is a reflection film that is formed by depositing metal having a high reflectance on the incident-side surface of the polarization converter.

3. The projector according to claim 1, wherein the extending portion is formed integrally on the light-irradiation-side surface of the second lens array.

4. A projector, comprising:

a light source;

an optical modulator that modulates a light beam irradiated by the light source in accordance with image information to form an optical image;

a projection optical device that projects the optical image formed by the optical modulator in an enlarged manner;

an integrator illumination optical system that uniforms the light beam irradiated by the light source to uniformly illuminate an image formation area of the optical modulator, the integrator illumination optical system having a first lens array, a second lens array and a polarization converter, the first lens array having a plurality of first small lenses in a plane substantially orthogonal to an optical axis of the light beam irradiated by the light source, the first lens array separating the light beam into a plurality of sub light beams by the plurality of first small lenses, the second lens array disposed on a light-irradiation side of the first lens array, the second lens array having a plurality of second small lenses corresponding to the plurality of first lenses of the first lens array, the second small lenses of the second lens array being each arranged with its convex surface oriented to the light-irradiation side, the polarization converter disposed on a light-irradiation side of the second lens array, the polarization converter aligning a polarization direction of the light beam irradiated from the second lens array substantially uniformly, the polarization converter having polarization separating layers, reflection layers and phase layers, the polarization separating layers each having a longitudinal direction in a first direction in a plane substantially orthogonal to the optical axis of the light beam irradiated by the light source, the polarization separating layers each transmitting a polarized light having one polarization direction while reflecting a polarized light having the other polarization direction in the light beam incident on the polarization separating layer, the reflection layers arranged alternately with the polarization separating layers along a second direction substantially orthogonal to the optical axis of the light beam irradiated by the light source and to the first direction, the reflection layers each reflecting the polarized light reflected by each of the polarization separating layers in the same direction as the polarized light transmitted by each of the polarization separating layers, the phase layers disposed at a position corresponding to the polarization separating layers or the reflection layers, the phase layers each converting the polarization direction of the polarized light beam incident thereon to the other polarization direction; and a light shield section provided on an incident-side surface of the polarization converter, the portion excluding a light-incident surface corresponding to the polarization separating layers, and the polarization converter having an extending portion formed on the incident-side surface of the polarization converter, the light-irradiation-side surface of the second lens array and the incident-side surface of the polarization converter facing each other, the extending portion of the polarization converter extending toward the light-irradiation-side surface of the second lens array, the second lens array and the polarization converter being directly bonded and fixed to each other at a portion where the extending portion of the polarization converter is bonded and fixed to the light-irradiation-side surface of the second lens array.

5. The projector according to claim 4, wherein the light shield section is a reflection film that is formed by depositing metal having a high reflectance on the incident-side surface of the polarization converter.

6. The projector according to claim 4, wherein the extending portion is formed integrally on the incident-side surface of the polarization converter.

* * * * *